United States Patent [19]

Goldner

[11] 4,099,779

[45] Jul. 11, 1978

[54] VEHICLE HEAD SUPPORT

[75] Inventor: Walther Göldner, Ebersbach, Fils, Germany

[73] Assignee: Recaro GmbH & Co., Kirchheim, Teck, Germany

[21] Appl. No.: 809,656

[22] Filed: Jun. 24, 1977

[30] Foreign Application Priority Data

Jul. 6, 1976 [DE] Fed. Rep. of Germany ....... 2630281

[51] Int. Cl.² ............................................. A47C 1/10
[52] U.S. Cl. .................................... 297/408; 297/410
[58] Field of Search .................................. 297/408–410

[56] References Cited

U.S. PATENT DOCUMENTS

| 3,603,642 | 9/1971 | Laessker | 297/408 |
| 3,655,241 | 4/1972 | Herzer et al. | 297/408 |
| 3,719,388 | 3/1973 | Fortnam | 297/410 X |

Primary Examiner—James C. Mitchell
Attorney, Agent, or Firm—Wigman & Cohen

[57] ABSTRACT

A head support particularly for use with motor vehicle seats is disclosed. The head support comprises a padded support member which is mounted on a pair of support bars, the later being fixedly secured to the back of the vehicle seat. The padded support comprises a body having a U-shaped cross-section which is adjustably swivellingly connected to the support bars by means of molded connecting bodies which, in turn, are vertically adjustable along the support bars. The connecting bodies and adjusting and swiveling mechanisms are located interiorly of the padded support to provide maximum safety for the vehicle occupants.

7 Claims, 4 Drawing Figures

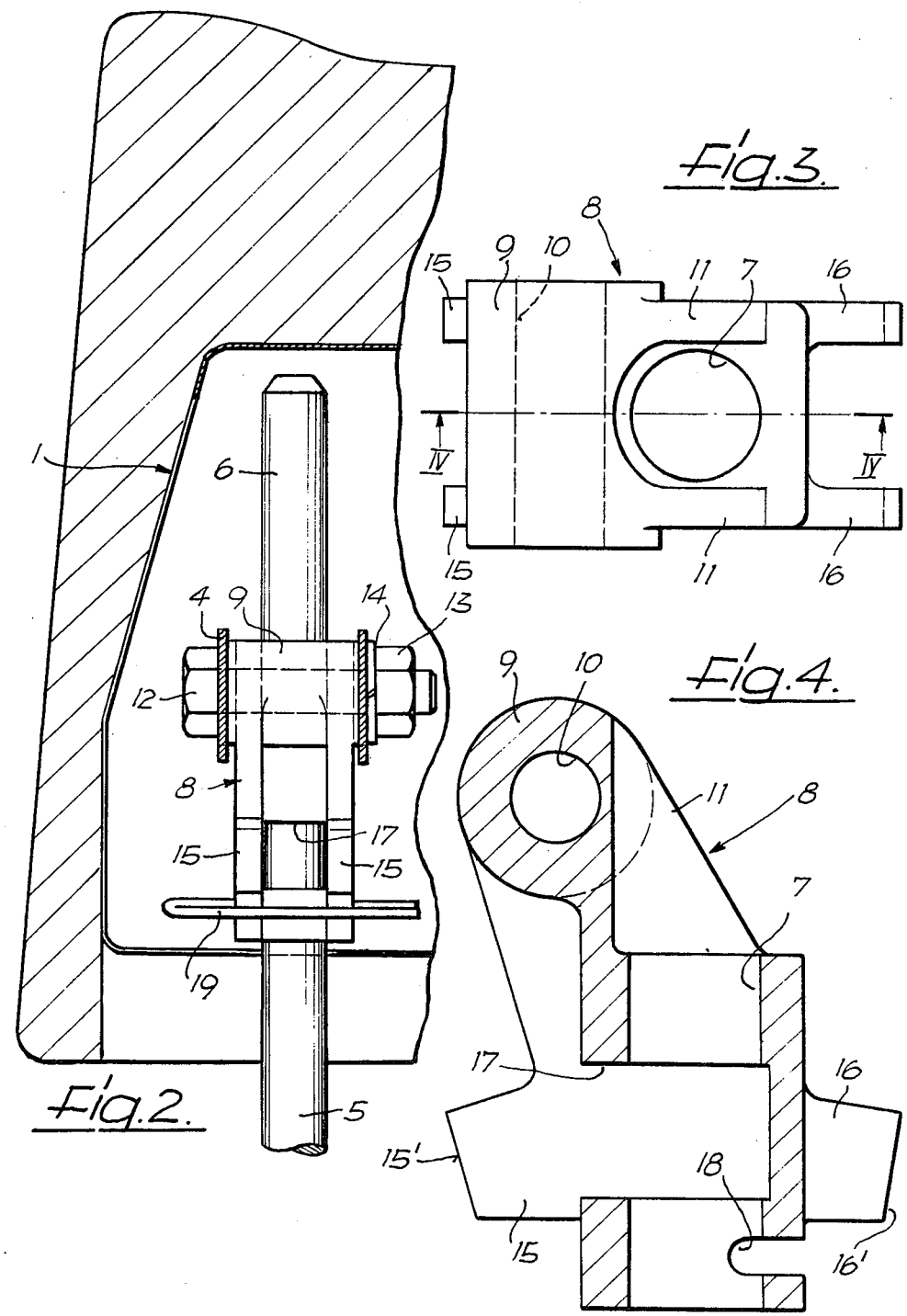

VEHICLE HEAD SUPPORT

BACKGROUND OF THE INVENTION

The present invention relates to a head support for vehicle seats, particularly motor vehicle seats, which includes a vertically adjustable padded support also adjustable in different swiveling positions. The padded support is connected by means of a swiveling device and a vertical adjusting device with a vertically non-adjustable fixture which is connected to the back of the seat.

In the case of a known head support of the aforementioned general type, the fixture consists of two elastic clamps clipped on the back of the seat from above and a plate connecting the two clamps with each other in the area of the ridge section. In the center of the plate, there are provided two U-section pieces comprising a swiveling device, the two shanks of which are interlocking. The two U-section pieces are connected to each other by means of the swiveling axle. The vertical adjusting device supports a plate serving as a padded support, consists of two telescopically interlocking parts and is connected with the section piece which can be swiveled vis-a-vis the plate. Such head support no longer fulfills contemporary safety requirements, not only because of the plate-shaped padded support but particularly because of an insufficient connection with the back of the seat. The forces exerted on the head support in the case of an accident can actually be such that they can only be safely transmitted to the back of the seat if the fixture has at least one support bar engaging into a guide connected with the frame of the back of the seat. Even so, head supports with one or two support bars are not free from disadvantages. If the bars are arranged in their guide for longitudinal sliding for the purpose of the vertical adjustment of the head support, there then exists the danger, if no special precautions are taken, that the lower end of the bar in the lower area of the vertical adjustment of the head support is so near to the rear surface of the back of the seat that, in case of an accident, a person who is thrown against such rear surface can thus be injured by the bars. If the bars are connected with the back of the seat in a vertically adjustable manner, then, in the case of the known head supports, either the swiveling device or the vertical adjusting device is disposed outside the head support and the back of the seat and thus in an area against which a person can be thrown should an accident occur.

SUMMARY AND OBJECTS OF THE INVENTION

The present invention is based on an object of providing a vertically adjustable and swiveling head support for vehicle seats which meets safety requirements. In the case of the present invention there exists a highly resistant connection with the back of the seat. The swiveling device and the vertical adjusting device are sufficiently safely covered up and the entire system is of a simple structure. This object has been accomplished in the case of a head support of the type mentioned above by means of the invention in such a manner that the fixture consists of two conventional bars whose upper ends project into the padded support which is designed as a body having a U-shaped cross-sectional profile. The bars are located in guide bores in a connecting body of the swiveling and vertical adjusting devices, where they can be longitudinally moved as well as secured in a selected position. The connecting body is arranged, in a substantially frictionless manner between bearing walls extending transversely across the inside of the padded support from its front wall to its back wall, on a swiveling axle supported by the bearing walls. Because the padded support is connected with the back of the seat by means of support bars, the required resistance of the head support can be easily obtained. The lower end of the support bar does not represent any danger, even without any additional precautions, when a person is thrown against the back of the seat, because of the vertically non-adjustable connection of the bars within the back of the seat. Nor do the parts used for the vertical adjustment and for the swiveling of the head support represent any danger because they are arranged inside the hollow padded support and thus are covered by the padded support itself as well as by the padding applied to the support. The arrangement of these parts inside the padded support has been made possible by the space-saving design of the swiveling and vertical adjusting devices which, apart from the connecting body, are formed with parts having a minimum space requirement. Therefore, the swiveling and vertical adjusting devices can still be arranged inside the padded support even if the interior space of the padded support is relatively small. The connecting body used for the swiveling as well as for the vertical adjustment has the additional advantage that the structural design of the swiveling and vertical adjusting devices is very simple and thus also inexpensive.

In the case of a preferred embodiment, the connecting body, preferably consisting of plastic, is made in one piece which is advantageous for manufacturing as well as for assembly purposes. It is, furthermore, advantageous to design the portion of the connecting body penetrated by the swiveling axle as a hub which bears, with its end surfaces, against the confronting sides of bearing walls inside the padded support and to provide the shaft of a screw as a swiveling axle equipped with a nut on its free end which nut bears against one of the bearing walls and pulls the screwhead against the other bearing wall. In this manner, the friction moment, which must be overcome for the swiveling of the head support, can be set at a desired value with very simple means.

The swiveling range of the head support is determined, in the case of a preferred embodiment, by the connecting body which, for this purpose, is provided with stop faces, preferably on projections spaced from the bore hole which receives the swiveling axle and on the sides of the connecting body confronting the front wall and the back wall of the padded support. These stop faces can be easily designed, with regard to their form and position, in such a manner that no deformation of the padded support occurs at the emplacement, even if the padded support is otherwise deformable for safety reasons.

The locking of the head support at different vertical positions is possible in different ways. In the case of a preferred embodiment, the connecting body has a groove in the wall defining the bar receiving guide bore and which extends transversely relative to the longitudinal axis of the guide bore and intersects the same. A section of a stop spring engages in the groove and, in this instance, the bar is provided with stop notches parallel to the groove in the section of the bar movable in the guide bore on the side thereof confronting the groove. Such a locking system has the advantage of being structurally extremely simple, of achieving a high holding power but still permitting an easy vertical adjustment. In order to prevent a vertical adjustment beyond the desired range, the uppermost and the lowermost notches are provided with a form which results in a positive locking with respect to vertical movement beyond that desired.

BRIEF DESCRIPTION OF THE DRAWINGS

The invention is explained in greater detail hereinbelow by means of an example shown in the drawings, wherein:

FIG. 2 is a cross-section taken along the line II—II of FIG. 1;

FIG. 3 is a top view of the connecting body; and

FIG. 4 is a cross-section taken along the line IV—IV of FIG. 3.

DETAILED DESCRIPTION OF A PREFERRED EMBODIMENT

Figure 1:
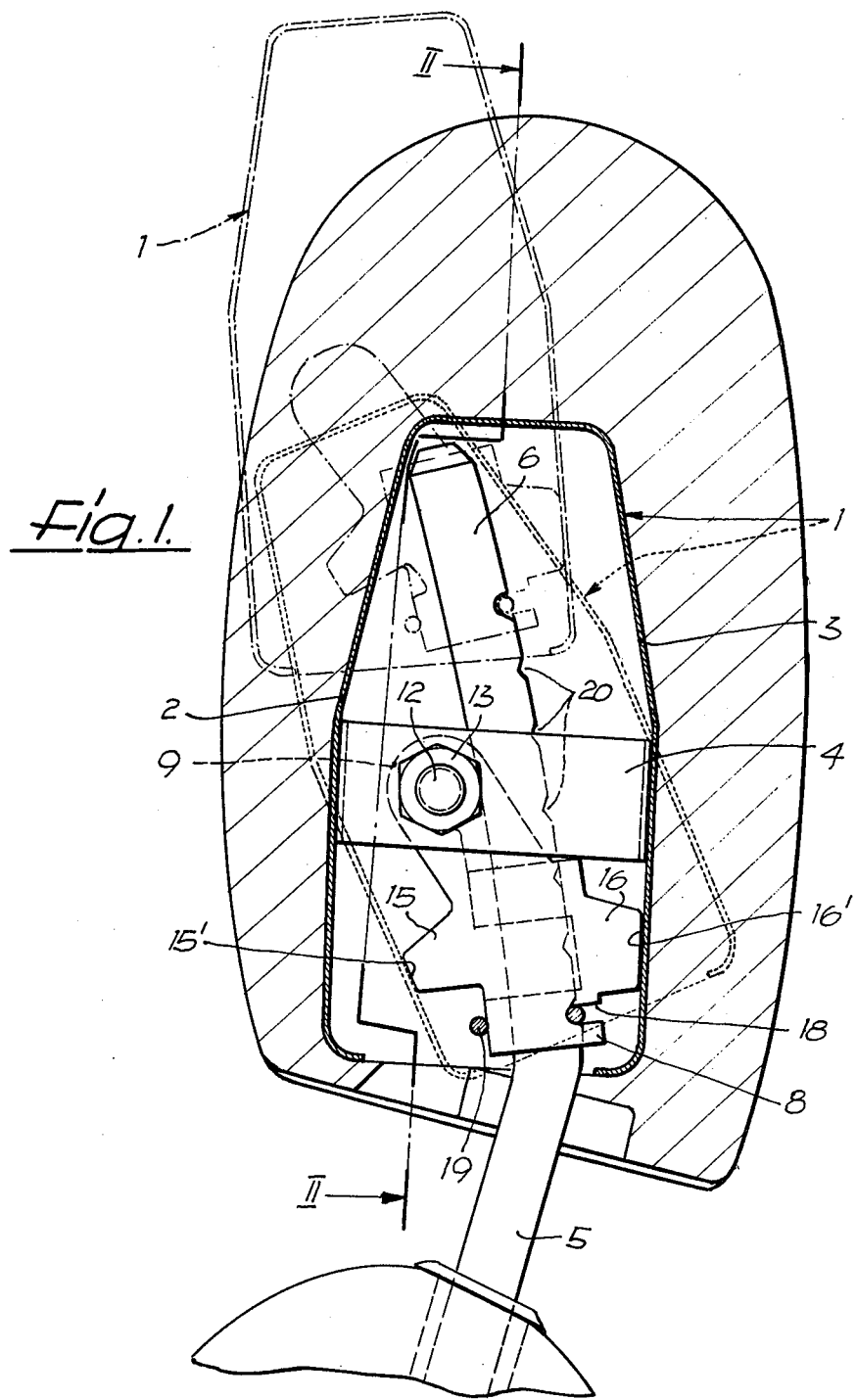
FIG. 1 is a cross-section of an embodiment of the invention in a plane in which the swiveling axle is perpendicular at three different positions of the head support.

Referring now to the drawings, a head support for a motor vehicle seat has, in the case of the illustrated embodiment, a padded support 1 made of a sheet metal which, as is shown in FIG. 1, has a generally U-shaped cross-section. The front wall 2 arranged toward the seated person and the back wall 3 diverge towards the bottom for about half the height of the padded support and thereafter extend parallel to one another, with the exception that the lower edges are both bent toward the inside and form a curvature. In addition, the lateral edges of the front wall 2 and the back wall 3 are bent toward each other and form a curvature. As best seen in FIG. 2, the padded support 1 is beveled in the region of the open side thereof. Interiorly of the padded support 1, i.e., in the lower half defined by the parallel sections of the front wall 2 and the back wall 3, two identical pairs of bearing walls or supports 4 are arranged symmetrically with respect to the transverse center plane of the support. Each pair of bearing walls is formed, in the described embodiment, by a rectangular-shaped frame bent from sheet metal, the two smaller sides of which bear respectively against the front wall 2 and the back wall 3 and are spotwelded to the walls 2, 3. The bearing walls 4 are provided with holes situated closer to the front wall 2 than to the back wall 3 in the embodiment shown in FIG. 1. The holes are aligned with each other and their longitudinal axes are parallel to the upper and lower sides of the padded support 1 and are arranged in a plane parallel to the longitudinal center plane of FIG. 1.

The padded support 1, being both vertically adjustable and swiveling, is connected with two identical support bars 5 which have a circular cross-section and engage with their upper terminal portions 6 interiorly of the padded support 1. The length of the portion of the upper terminal 6 bent toward the front is about equal to the height of the padded support 1. The not particularly illustrated vertically non-adjustable connection of the two support bars 5 with the frame of the associated seat back is provided by sleeves rigidly connected with the upper traverse of the frame of the back of the seat, these sleeves receiving the lower terminal portions of the support bars 5. This lower terminal portion is provided with a stop notch into which a stop spring engages, the latter being guided along a groove of the sleeve. The shape of the stop notch is selected in such a manner that a positive locking connection results in the longitudinal direction of the support bar. However, the locking connection can be released by turning the support bar in the sleeve since the stop notch is designed to extend only over a portion of the circumference of the support bar.

The upper terminal section 6 of each support bar 5 is guided in a longitudinally movable manner in a guide bore 7 of a one-piece connecting body 8 made, preferably, of a synthetic plastic. The part of the connecting body 8 containing the guide bore 7 is designed in a sleeve-like manner. A hub 9 is molded to the upper end of the part 8. The longitudinal axis of a bore 10 in hub 9 extends at right angles to the longitudinal axis of the guide bore 7. Furthermore, as is shown in FIG. 4, the bore hole 10 is radially offset with respect to the longitudinal axis of the guide bore 7 to an extent that the upper terminal section 6 of the support bar 5 just passes the hub 9 and hole 10. The connection between the hub 9 and the portion of part 8 having the guide bore 7 is reinforced by reinforcing ribs 11 which are molded to the hub 9 and to the portion of part 8 having the guide bore 7. As is shown in FIG. 3, the ribs are spaced a distance from each other which is somewhat larger than the diameter of the guide bore 7 so that the reinforcing ribs 11 do not impede the penetration of the connecting body 8 by the upper terminal section 6 of the support bar 5.

The axial length of the hub 9 is adapted to the distance between the bearing walls 4, therefore, its two end surfaces bear at the bearing walls 4. The shaft of a screw 12 penetrating the holes of the bearing walls 4 and the hole 10 of hub 9 comprises a swiveling axle. The bearing walls 4 are urged against end faces of the hub 9 by means of a nut 13 screwed onto the free end of the screw 12 to obtain the required friction moment. Safety lock washer elements 14 prevent a loosening of the screwed connection with the swiveling of the head support.

Two projecting stop ribs 15 and 16, respectively, are molded to the sides of the connecting body 8 and are arranged directed towards the front and back walls 2 and 3, respectively, in the region of the portion of part 8 carrying the guide bore 7 for the purpose of limiting the swiveling range of the head support. The stop ribs 15, 16 are aligned with the reinforcing ribs 11. The shape of the stop ribs 15 is selected in such a manner that the free, plane front surfaces 15' thereof rest with their full surfaces at the front wall 2 at the desired maximum angle of inclination of the padded support 1. Correspondingly, the stop ribs 16 are designed in such a manner that their free, plane front surfaces 16' rest with their full surfaces at the back wall 3 in the other final or stop position in which, in the illustrated embodiment, the padded support 1 is approximately vertical. For manufacturing reasons, the part of the connecting body 8 forming the guide bore 7 has a recess 17 between the two stop ribs 15.

Beneath the stop ribs 16 confronting the back wall 3, but at a distance from the lower ends thereof, the connecting body 8 is provided with a guide notch or slot 18 in which a first elastic shank of a stop spring 19 is disposed. The guide notch 18 extends, as is shown particularly in FIG. 4, transversely to the longitudinal axis of the guide bore 7 and its depth is such that the first shank of the stop spring 19 resting therein is disposed within the free cross-section of the guide bore 7. The stop spring 19 comprises a hairpin-like spring whose second shank rests against the outside of the connecting body 8 which confronts the front wall 2 as best seen in FIG. 1. The upper terminal section 6 is provided, on the side thereof confronting the back wall 3, with several stop notches 20 arranged in the longitudinal direction of the terminal section 6 at a distance from each other and parallel to the guide notch 18. The first shank of the stop spring 19 located in the guide notch 18 engages into the respective stop notch 20 which is aligned with the guide notch 18. The shape of the stop notches 20, with the exception of the uppermost and lowermost stop notches, has been selected in such a manner that the stop device releases the padded support 1 when a force exerted upon it in the longitudinal direction of the upper terminal section 6 exceeds a given limit value, which limit value is determined by means of a corresponding inclination of the two flanks of the stop notches 20, i.e., the flanks of the V-shaped notches. On the other hand, the uppermost stop notch flank located toward the free end of the bar 5 and the lowermost stop notch flank located toward the bend of the bar 5 are designed in such a manner that a positive locking connection is provided so that the padded support 1 cannot be adjusted beyond the highest and lowest positions. When disassembling the unit, the stop spring 19 is lifted out of the guide notch 18 by means of a tool.

The position of the padded support illustrated in solid lines in FIG. 1 represents its lowest position swiveled farthest toward the rear. Shown in dotted lines in FIG. 1 is the position of the padded support when it is in its lowest position and is swiveled as far as possible towards the front. The highest position of the padded support 1 swiveled farthest toward the rear is illustrated by the dash-and-dot lines of FIG. 1. The padded support 1 is covered on all sides by a padded body which has at its lower end a slot for assembly purposes as well as for the penetration of the support bars 5. Preferably, the padded body is provided with a covering material.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. In a head support for a vehicle seat, especially for a motor vehicle seat comprising a padded body connected to a vertically non-adjustable fixture secured to the back of the seat, said padded body being vertically and swivelingly adjustable relative to the seat, the improvement comprising said padded body comprising a padded support having a substantially U-shaped cross-sectional profile including front and rear wall portions, spaced bearing walls mounted interiorly of said padded support and extending between the front and rear wall portions thereof, a swivel axle supported between said bearing walls, a connecting body swivelly mounted on said axle within said padded support, said connecting body having a guide bore therethrough, said fixture including a support bar having an upper terminal portion extending upwardly through the guide bore of the connecting body, means for adjustably securing said connecting body in a selected swivel position about said axle and means cooperating between said support bar and said connecting body for adjustably securing said connecting body in a selected vertical position on said support bar.

2. The improvement according to claim 1, wherein said connecting body is fabricated in one piece of a synthetic plastic material.

3. The improvement according to claim 1, wherein said means for adjustably securing said connecting body in a selected swivel position comprises a hub on said connecting body through which said axle extends, said hub having opposite end surfaces, each end surface bearing against the inside of a respective bearing wall, said axle comprising a threaded screw having a screwhead and a free end, a nut threadably received on said free end, said screwhead and said nut frictionally bearing against the outside of a respective bearing wall by means of the force exerted by threading said nut onto the free end of said screw.

4. The improvement according to claim 3, wherein said hub is arranged at an upper portion of said connecting body.

5. The improvement according to claim 1, wherein said connecting body includes means limiting the swiveling range thereof, said limiting means comprising projections having stop surfaces and extending from said connecting body toward and in confronting relation with both said front and rear wall portions, said projections being spaced from the swivel axis of said connecting body.

6. The improvement according to claim 1, wherein said means for adjustably securing said connecting body in a selected vertical position comprises a groove in said connecting body in a wall thereof delimiting said guide bore, said groove extending transversely of and intersecting a portion of said guide bore, the upper terminal portion of said support bar having vertically spaced notches arranged parallel with the groove in the connecting body and a stop spring arranged in said groove and engageable with a selected one of said notches.

7. The improvement according to claim 6, wherein the uppermost and lowermost notches on said support bar include means preventing vertical movement of said connecting body beyond said uppermost and lowermost notches.

* * * * *